US010197283B2

(12) United States Patent
Heynen et al.

(10) Patent No.: US 10,197,283 B2
(45) Date of Patent: Feb. 5, 2019

(54) INTEGRATED DUAL FUEL DELIVERY SYSTEM

(71) Applicant: ANSALDO ENERGIA SWITZERLAND AG, Baden (CH)

(72) Inventors: Fridolin Heynen, Würenlingen (CH); Inaki Maiztegui, Baden (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 348 days.

(21) Appl. No.: 15/079,636

(22) Filed: Mar. 24, 2016

(65) Prior Publication Data

US 2016/0281993 A1   Sep. 29, 2016

(30) Foreign Application Priority Data

Mar. 27, 2015   (EP) ..................... 15161427

(51) Int. Cl.
*F23R 3/36* (2006.01)
*F02C 7/22* (2006.01)
*F02C 7/228* (2006.01)
*F02C 9/40* (2006.01)

(52) U.S. Cl.
CPC .................. *F23R 3/36* (2013.01); *F02C 7/22* (2013.01); *F02C 7/222* (2013.01); *F02C 7/228* (2013.01); *F02C 9/40* (2013.01); *F05D 2260/96* (2013.01)

(58) Field of Classification Search
CPC ........ F23R 3/36; F23D 2204/10; F02C 7/222; F02C 7/228; F02C 9/40; F02M 43/00
USPC .................................... 60/739, 742
See application file for complete search history.

(56) References Cited

U.S. PATENT DOCUMENTS

| 3,777,983 | A | * | 12/1973 | Hibbins | ................. | F23D 11/10 |
| | | | | | | 239/406 |
| 4,028,888 | A | * | 6/1977 | Pilarczyk | ................ | F02C 7/222 |
| | | | | | | 239/550 |
| 4,201,046 | A | | 5/1980 | De Negris et al. | | |
| 4,467,610 | A | | 8/1984 | Pearson et al. | | |
| 4,833,878 | A | * | 5/1989 | Sood | ........................ | F02C 9/40 |
| | | | | | | 60/39.463 |

(Continued)

FOREIGN PATENT DOCUMENTS

| CA | 1 170 844 A1 | 7/1984 |
| EP | 2 189 720 A1 | 5/2010 |

(Continued)

OTHER PUBLICATIONS

Search Report dated Aug. 27, 2015, by the European Patent Office for Application No. 15161427.

(Continued)

*Primary Examiner* — William H Rodriguez
(74) *Attorney, Agent, or Firm* — Buchanan Ingersoll & Rooney PC

(57) ABSTRACT

The present invention relates to dual fuel delivery system for a gas turbine. A dual fuel delivery system for a gas turbine includes: a main fuel line having a main fuel oil conduit and a main fuel gas conduit, wherein the main fuel gas conduit encloses, at least partially, the main fuel oil conduit; and a fuel ring connected to the main fuel line, the fuel ring having a fuel gas ring connected to the main fuel gas conduit and a fuel oil ring connected to the main fuel oil conduit, wherein the fuel gas ring encloses, at least partially, the fuel oil ring.

20 Claims, 6 Drawing Sheets

(56) References Cited

U.S. PATENT DOCUMENTS

| | | | | |
|---|---|---|---|---|
| 5,036,657 | A | * | 8/1991 | Seto .................. F02C 7/222 60/39.281 |
| 5,211,005 | A | * | 5/1993 | Hovnanian ............ F02C 7/22 60/739 |
| 5,361,578 | A | | 11/1994 | Donlan |
| 5,408,830 | A | * | 4/1995 | Lovett ................ F23D 17/002 239/422 |
| 5,437,158 | A | * | 8/1995 | Fric .................. F23R 3/10 60/739 |
| 5,884,471 | A | * | 3/1999 | Anderson ............ F02C 7/222 60/39.23 |
| 6,189,321 | B1 | * | 2/2001 | Banhardt ............. F02C 7/222 60/39.281 |
| 2007/0207425 | A1 | * | 9/2007 | Brautsch ............ F23D 11/108 431/159 |
| 2009/0277182 | A1 | | 11/2009 | Engelbrecht et al. |
| 2010/0050645 | A1 | * | 3/2010 | Haggerty ............. F02C 7/222 60/739 |
| 2010/0242482 | A1 | | 9/2010 | Kraemer et al. |
| 2011/0179803 | A1 | * | 7/2011 | Berry ................ F01D 9/06 60/785 |
| 2012/0055162 | A1 | * | 3/2012 | Eroglu ............... F23D 17/002 60/740 |
| 2013/0091824 | A1 | * | 4/2013 | Murakami ............ F01D 25/12 60/39.094 |

FOREIGN PATENT DOCUMENTS

| | | |
|---|---|---|
| EP | 2 236 935 A2 | 10/2010 |
| GB | 2 462 915 A | 3/2010 |

OTHER PUBLICATIONS

Search Report dated Oct. 9, 2015, by the European Patent Office for Application No. 15161382.

* cited by examiner

INTEGRATED DUAL FUEL DELIVERY SYSTEM

TECHNICAL FIELD

The present invention relates to a fuel delivery system, and more particularly the invention relates to dual fuel delivery system for a gas turbine engine.

BACKGROUND

Modern gas turbines may operate on a number of different fuels, such as various kinds of liquid and gaseous fuels. For this reason, power plants may have gas turbine engines that can operate with dual fuel capability, for example, natural gas and diesel fuel. In general, the choice of operational fuel depends on the price, availability and operational parameters.

Gas turbines comprise various types of combustors configured to produce a hot gas by burning a fuel in a compressed air. The fuel is introduced in the combustor using one or more fuel nozzles. To provide an operational flexibility, the nozzles usually have capabilities to inject a dual fuel.

Dual fuel has to be delivered to the fuel nozzles from the fuel source. Design of such dual fuel delivery systems has various challenges such as: space constrains, vibrational instabilities and thermal expansions.

FIG. 2 shows a fuel delivery system 200 comprising two fuel ring pipes, 202 and 204. Each of the ring pipes, 202 and 204, supplies one type of the fuel, and each pipe has plurality of fuel feeds 206 which are connected to combustor burners (not shown) of a gas turbine. In the configuration where every burner has one lance, one branch from each of the ring pipes 202 and 204 supplies two types of the fuel to the single burner. This design results in the high level of complexity and high number of supply lines and connections. FIG. 3 shows dual fuel supply system 300 for a burner 312 having several (in this example three) injection nozzles 310. Two types of fuel, 302 and 304, are supplied to every nozzle 310. Fuel 302 is supplied via a first fuel line 306, while second fuel 304 is supplied via a second fuel line 308. Similarly to the design from FIG. 2, this fuel delivery system is not compact and it could suffer from thermal and vibrational instabilities.

What is desired, therefore, is dual fuel delivery system that is simpler and more efficient than the systems from the prior art.

SUMMARY OF THE INVENTION

In view of the above mentioned problems, it is primary object of the present invention to provide an improved dual fuel delivery system for a gas turbine engine.

One object of the present invention is to provide improved dual fuel delivery system in terms of the complexity and space saving.

Another object of the present invention is to provide improved dual fuel delivery system in terms of thermal and vibrational stability.

Yet another object of the present invention is to provide improved dual fuel system particularly adapted to substantially cylindrical shaped burners.

The above and other objects of the invention are achieved by a dual fuel delivery system for a gas turbine, comprising: a main fuel line having a main fuel oil conduit and a main fuel gas conduit, wherein the main fuel gas conduit encloses, at least partially, the main fuel oil conduit; and a fuel ring connected to the main fuel line, the fuel ring having a fuel gas ring connected to the main fuel gas conduit and a fuel oil ring connected to the main fuel oil conduit, wherein the fuel gas ring encloses, at least partially, the fuel oil ring.

According to one preferred embodiment, the dual fuel delivery system further comprises at least one fuel feed line connected to the fuel ring, the fuel feed line having a fuel gas feed line connected to the fuel gas ring and a fuel oil feed line connected to the fuel oil ring, wherein the fuel gas feed line encloses, at least partially, the fuel oil feed line.

According to yet another embodiment, the connection between the fuel oil feed line and the fuel oil ring comprises extension means, preferably a metal hose.

According to another embodiment, the fuel gas feed line comprises extension means, preferably a bellow.

According to yet another embodiment, the fuel feed line comprises a dual fuel nozzle.

According to another embodiment, the main fuel gas conduit comprises extension means, preferably a metallic bellow.

According to yet another embodiment, the dual fuel further comprises a sliding fixation between the fuel gas ring and the fuel oil ring According to another embodiment, a connection angle between a fuel ring plane and the main fuel line is different from 0 degrees. In one preferred embodiment, the main fuel line and the fuel ring are connected substantially at 90 degrees angle. This embodiment is particularly advantageous regarding space saving inside a gas turbine. In another embodiment, the main fuel line and the fuel ring are connected via L-shaped connection.

According to yet another embodiment, the dual fuel delivery further comprises a fuel manifold connected to the inlet of the main fuel line and adapted to supply fuel gas to the main fuel gas conduit and fuel oil to the main fuel oil conduit.

The present application also relates to a gas turbine comprising dual fuel delivery system. In one preferred embodiment, a gas turbine comprises a can combustor, a cooling air housing, and a burner, wherein the inlet of the main fuel line is positioned outside the can housing and the outlet of the main fuel line is positioned between the cooling air housing and the burner, and wherein the fuel ring is positioned between the cooling air housing and the burner.

In addition, the present application also provides for a method for delivering dual fuel to the burner of the gas turbine comprising the dual fuel delivery system. The method comprising steps: supplying fuel oil and/or fuel gas to the main fuel line, and guiding fuel oil and/or fuel gas to the burner.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF DRAWINGS

Preferred embodiments of the invention are described in the following with reference to the drawings, which are for the purpose of illustrating the present preferred embodiments of the invention and not for the purpose of limiting the same. In the drawings.

DETAILED DESCRIPTION OF THE INVENTION

Figure 1:
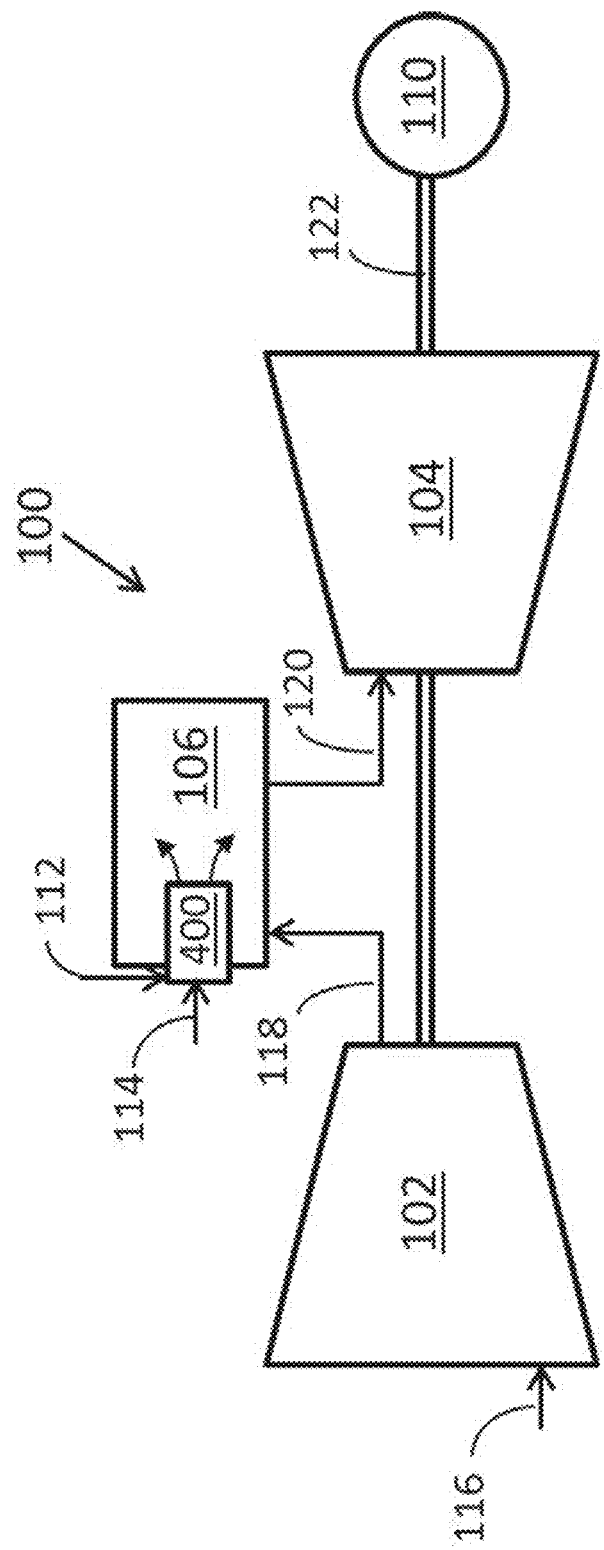
FIG. 1 is a schematic diagram of a gas turbine according to the invention.
Figure 2:
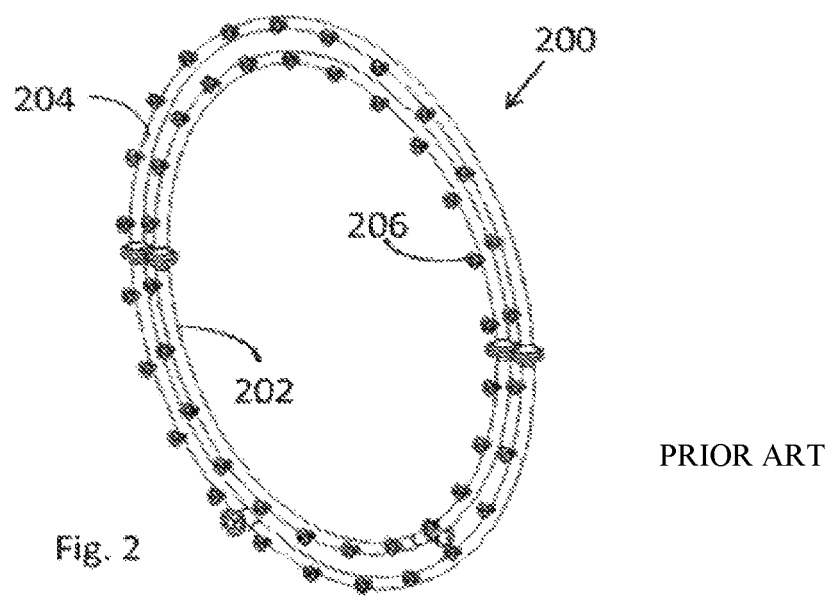
FIG. 2 is a perspective view of dual ring fuel delivery system from prior art.
Figure 3:
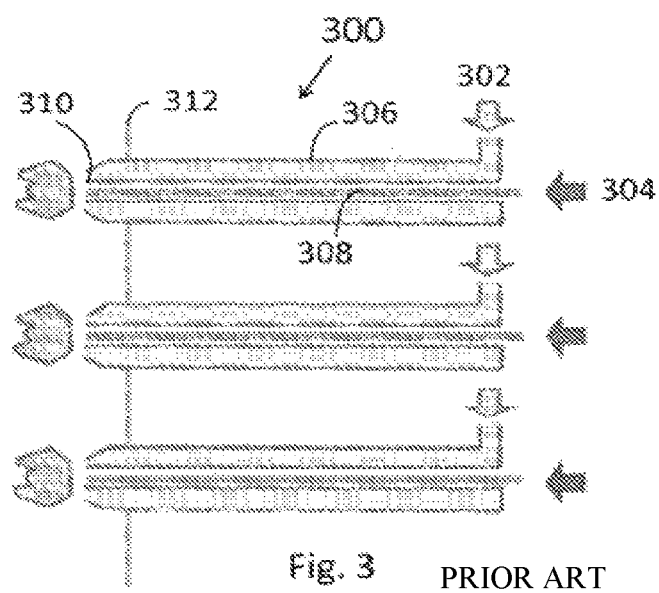
FIG. 3 is a schematic diagram of a fuel delivery system from prior art.

Referring now to the drawings, in which like numerals refer to like elements throughout the several views, FIG. 1 shows a schematic view of gas turbine engine according to one embodiment of the invention. The gas turbine 100 is comprised of a compressor 102, which compresses a flow of an inlet air 116. The compressed air 118 is directed to a combustor 106 which may comprise several combustor cans and burners. In the combustor 106, the air 116 is mixed with fuel oil 112 or fuel gas 114, and the mixture of air and fuel is ignited to create a flow of hot combustion gases 120, which are directed to drive a turbine 104. The mechanical work produced in the turbine 104 drives the compressor 102 and load 110 via a shaft 122. Fuels 112 and 114 are delivered to the combustor 106 via a dual fuel delivery system 400 according to the invention.

Figure 4:
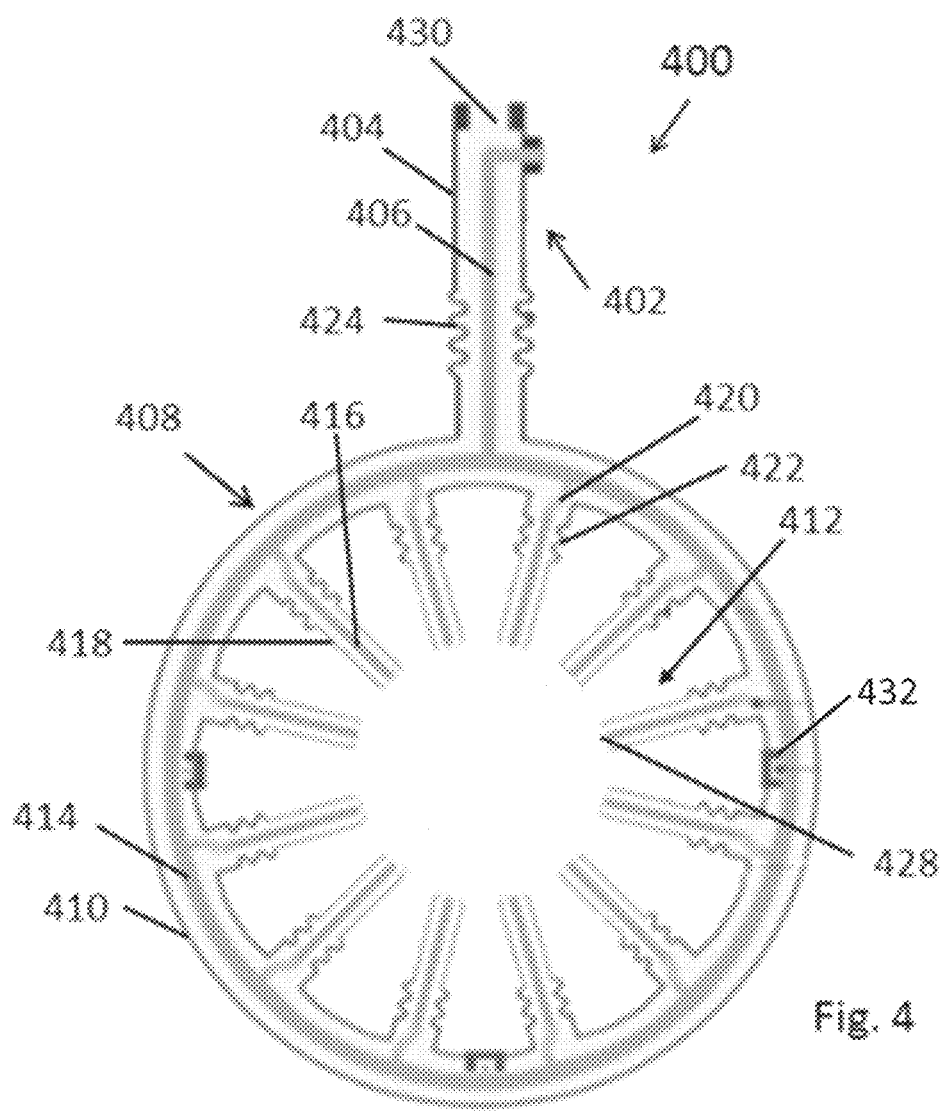
FIG. 4 is a schematic representation of a dual fuel delivery system according to one embodiment of the present invention.

FIG. 4 shows the dual fuel delivery system 400 according to the invention, which may be used with the gas turbine 100. The dual fuel delivery system 400 comprises a main fuel line 402 having a main fuel oil conduit 406 and a main fuel gas conduit 404. In the preferred embodiment shown in FIG. 4, the conduits 404 and 406 are in the form of two concentric conduits, wherein the main fuel gas conduit 404 completely encloses the main fuel oil conduit 406, except for the entry section of the conduit 406. In general, the main fuel gas conduit 404 encloses at least partially the main fuel oil conduit 406. The dual fuel delivery system 400 comprises also a fuel ring 408 connected to the main fuel line 402. The fuel ring 408 comprises a fuel gas ring 410 connected to the main fuel gas conduit 404, and a fuel oil ring 414 connected to the main fuel oil conduit 406. The fuel gas ring 410 encloses, at least partially, the fuel oil ring 414. In the preferred embodiment, shown in FIG. 4, the fuel gas ring 410 encloses completely the fuel oil ring 414. In the one preferred embodiment of the present invention, the dual fuel delivery system 400 further comprises at least one fuel feed line 412 connected to the fuel ring 408. The example in FIG. 4 shows twelve identical feed lines 412 connected to the fuel ring 408 and extending from the fuel ring 408. The fuel feed line 412 has a fuel gas feed line 418 connected to the fuel gas ring 410 and a fuel oil feed line 416 connected to the fuel oil ring 414. The fuel gas feed line 418 encloses, at least partially, the fuel oil feed line 416.

Additional advantageous features which contribute to avoid thermal expansions and negative vibrational effects are also show in FIG. 4. Firstly, the main fuel gas conduit 404 may comprise an extension means, preferably a metallic bellow 424. Secondly, the fuel gas feed lines 418 may comprise extension means, preferably bellows 422. Thirdly, the connections between the fuel oil feed line 416 and the fuel oil ring 414 may comprise extension means such as a metal hoses 420. Finally, dual fuel delivery system 400 may comprise sliding fixations 432 between the fuel gas ring 410 and the fuel oil ring 414.

In the one preferred embodiment of the present invention, the dual fuel delivery system 400 further comprises at least one fuel feed line 412 connected to the fuel ring 408.

FIG. 4 is a schematic, simplified and two-dimensional representation of the dual fuel delivery system 400. The main fuel line 402, the fuel ring 408 and fuel feed lines 412 are not necessarily all positioned in one plane. In general, the fuel ring 408 is positioned in a fuel ring plane, and the main fuel line 402 is connected to the fuel ring 408 at a connection angle, which is defined as an angle between the fuel ring plane and the main fuel line 402.

Figure 5:
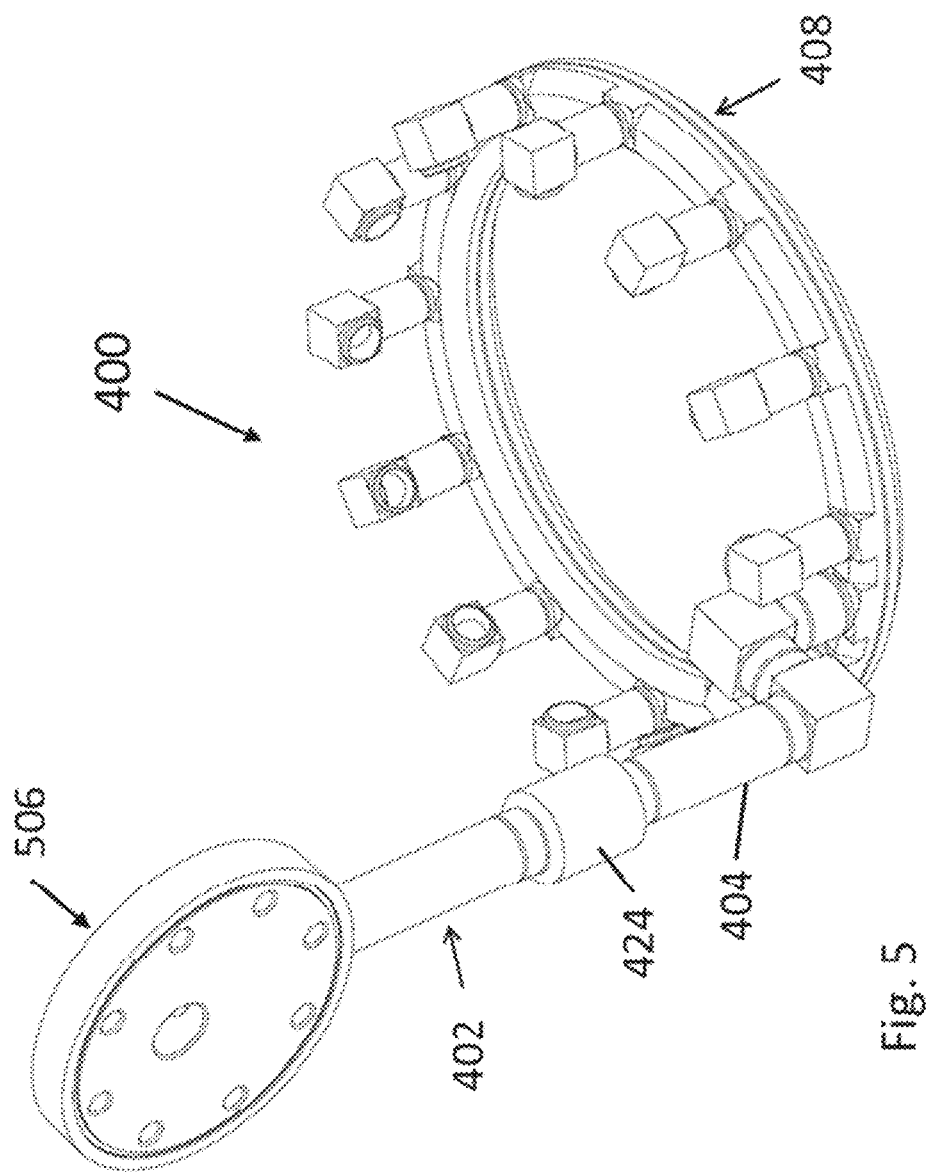
FIG. 5 is a perspective view of a dual fuel delivery system according to one embodiment of the present invention.

FIG. 5 shows a perspective view of dual fuel delivery system 400 according to one preferred embodiment of the present invention. FIG. 5 shows only external part of the system 400, without showing internal gas oil conduits and rings. Contrary to the embodiment of FIG. 4 where the connection angle is zero degrees (i.e. the fuel ring 408 and the main fuel line 402 are in the same plane), the connection angle in an embodiment of FIG. 5 is substantially 90 degrees. In this way, dual fuel delivery system 400 has an advantageously compact size. The connection angle may be >10 degrees, preferably greater of 50 degrees up to 90 degrees In one preferred embodiment, the main fuel line 402 and the fuel ring 408 are connected via L-shaped connection, as shown in FIG. 5. This embodiment is particularly advantageous regarding the positioning of the dual fuel supply system inside the gas turbine 100. FIG. 5 shows also a fuel manifold 506 connected to the inlet of the main fuel line 402. The manifold 506 is used to supply fuel gas and oil gas to the main fuel line 402. The manifold 506 is, in general, connected to the external fuel supply (not shown).

Figure 6:
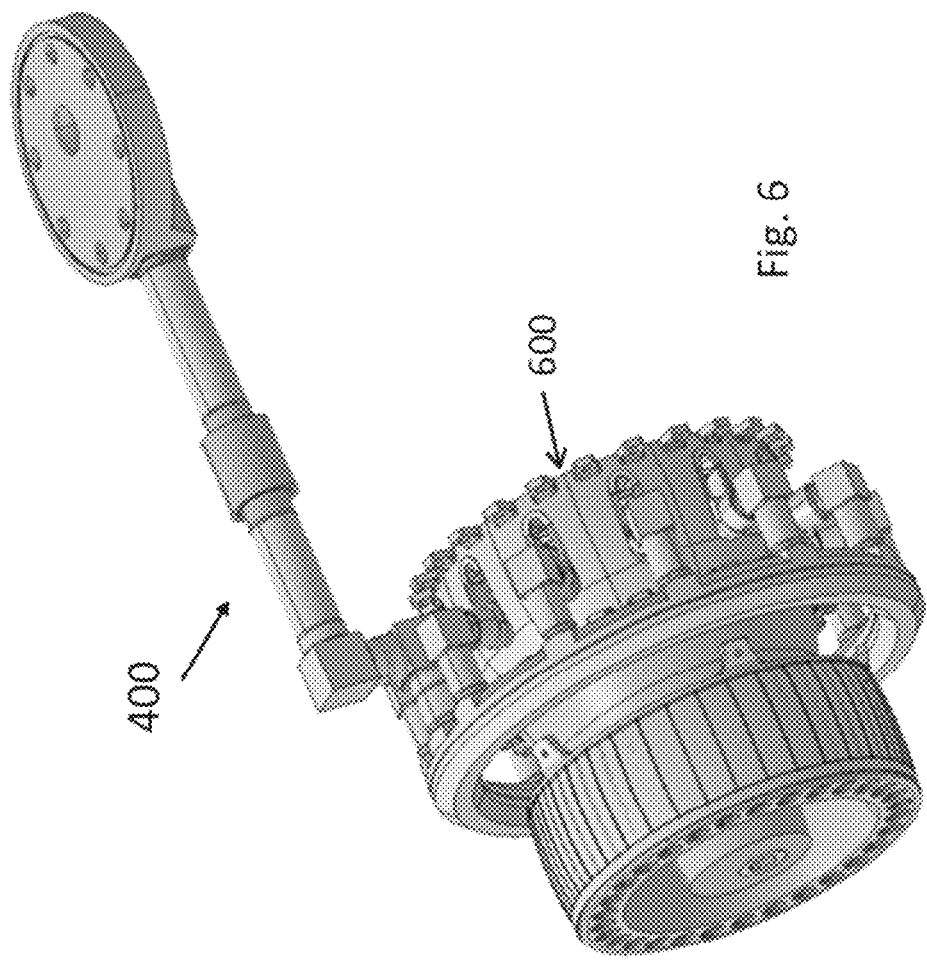
FIG. 6 is a perspective view of a dual fuel delivery system according to one embodiment of the present invention.

FIG. 6 shows a perspective view of the dual fuel delivery system 400 according to preferred embodiment of the present invention in combination with a cylindrical burner 600 adapted to receive the fuel feed lines 412.

Figure 7:
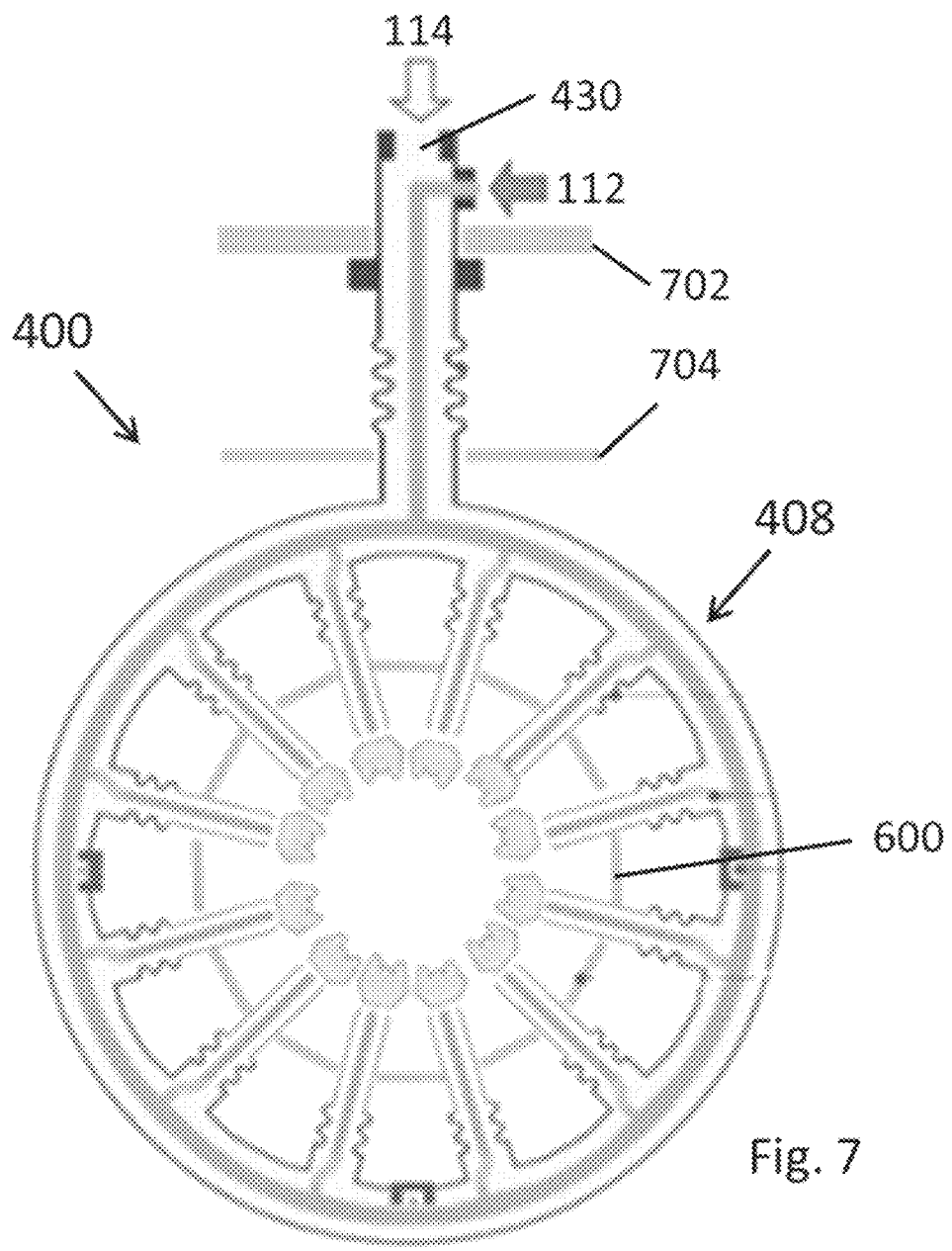
FIG. 7 is a schematic representation of a dual fuel delivery system inside a gas turbine according to one embodiment the present invention.

The present invention also discloses a gas turbine engine 100 adapted to be used with the dual fuel delivery system 400 according to the invention. FIG. 7 shows schematically representation of the part of the gas turbine 100, wherein only parts of the walls of the main components are shown. As shown in FIG. 7, gas turbine preferably comprises a can combustor 702, a cooling air housing 704, and a burner 600 adapted to receive the fuel feed lines 412. In one preferred embodiment the inlet of the main fuel line 430 is positioned outside the can housing 702 and the outlet of the main fuel line 402 is positioned between the cooling air housing 704 and the burner 600, and the fuel ring 408 is positioned between the cooling air housing 704 and the burner (600). The outlets of the feed lines 412 are positioned inside the burner 600

FIG. 7 also illustrates the method for delivering dual fuel, fuel oil 112 and fuel gas 114, to the burner 600 of the gas turbine 100 comprising the dual fuel delivery system 400. Fuel oil 112 and/or fuel gas 114 are supplied to the main fuel line 402, and then they are guided through the ring 408 to the burner 600 via the feed lines 412. The fuel is then mixed with compressed air and burned.

It should be apparent that the foregoing relates only to the preferred embodiments of the present application and that numerous changes and modifications may be made herein by one of ordinary skill in the art without departing from the scope of the invention as defined by the following claims.

LIST OF DESIGNATIONS

100 Gas turbine engine
102 Compressor
104 Turbine
106 Combustor
110 Load
112 Fuel oil
114 Fuel gas
116 Inlet air
118 Compressed air
120 Combustion gas
122 Shaft
200 Fuel delivery system
202 Fuel ring pipe
204 Fuel ring pipe
206 Fuel feed
300 Dual fuel supply system
302 Fuel
304 Fuel
306 Fuel line
308 Fuel line
310 Nozzle
312 Burner
400 Dual fuel delivery system
402 Main fuel line
404 Main fuel gas conduit
406 Main fuel oil conduit
408 Fuel ring
410 Fuel gas ring
412 Fuel feed line
414 Fuel oil ring
416 Fuel oil feed line
418 Fuel gas feed line
420 Metal hose
422 Bellow
424 Bellow
428 Nozzle
430 Inlet of main fuel line
432 Sliding fixation
506 Fuel manifold
600 Burner
702 Can housing
704 Cooling air housing

The invention claimed is:

1. A dual fuel delivery system for a gas turbine, comprising:
a main fuel line having a main fuel oil conduit through which fuel oil is passable and a main fuel gas conduit through which fuel gas is passable, wherein the main fuel gas conduit encloses, at least partially, the main fuel oil conduit, the main fuel gas conduit having an extension to mitigate thermal expansions and negative vibrational effects, the extension of the main fuel gas conduit being positioned to encircle a portion of the main fuel oil conduit, the extension of the main fuel gas conduit being positioned between an inlet of the main fuel gas conduit and an outlet of the main fuel gas conduit; and
a fuel ring connected to the main fuel line, the fuel ring having a fuel gas ring connected to the main fuel gas conduit so that fuel gas is passable from the main fuel line to the fuel ring and a fuel oil ring connected to the main fuel oil conduit so that fuel oil is passable from the main fuel line to the fuel ring, wherein the fuel gas ring encloses, at least partially, the fuel oil ring.

2. The dual fuel delivery system of claim 1, comprising:
at least one fuel feed line connected to the fuel ring, the fuel feed line having a fuel gas feed line connected to the fuel gas ring and a fuel oil feed line connected to the fuel oil ring, wherein the fuel gas feed line encloses, at least partially, the fuel oil feed line.

3. The dual fuel delivery system of claim 2, wherein a connection between the fuel oil feed line and the fuel oil ring comprises an extension comprising hoses or metallic hoses.

4. The dual fuel delivery system of claim 3, wherein the fuel gas feed line comprises an extension comprising a bellows or metallic bellows.

5. The dual fuel delivery system of claim 2, comprising a dual fuel nozzle connected to the fuel feed line.

6. The dual fuel delivery system of claim 1, wherein the extension of the main fuel gas feed conduit comprises bellows or metallic bellows.

7. The dual fuel delivery system of claim 1, comprising at least one sliding fixation between the fuel gas ring and the fuel oil ring to contribute to avoiding thermal expansions and negative vibrational effects.

8. The dual fuel delivery system of claim 1, wherein a connection angle between a fuel ring plane of the fuel ring and the main fuel line is different from 0 degrees.

9. The dual fuel delivery system of claim 1, wherein the main fuel line and the fuel ring are connected via an L-shaped connection.

10. The dual fuel delivery system of claim 1, comprising a fuel manifold connected to an inlet of the main fuel line, and adapted to supply fuel gas to the main fuel gas conduit and fuel oil to the main fuel oil conduit.

11. A gas turbine comprising the dual fuel delivery system of claim 1.

12. A gas turbine of claim 11, comprising a can combustor, a cooling air housing, and a burner, wherein an inlet of the main fuel line is positioned outside a housing of the can combustor and an outlet of the main fuel line is positioned between the cooling air housing and the burner, and wherein the fuel ring is positioned between the cooling air housing and the burner.

13. A method for delivering dual fuel to the burner of the gas turbine of claim 12, the method comprising:
supplying fuel oil and/or fuel gas to the main fuel line; and
guiding fuel oil and/or fuel gas to the burner.

14. The dual fuel delivery system of claim 1, wherein the fuel gas ring is connected to the fuel oil ring via sliding fixations between the fuel gas ring and the fuel oil ring to contribute to avoiding thermal expansions and negative vibrational effects.

15. The dual fuel delivery system of claim 14, comprising:
at least one fuel feed line connected to the fuel ring, the fuel feed line having a fuel gas feed line connected to the fuel gas ring so that fuel gas is passable from the fuel gas ring to the fuel gas feed line and a fuel oil feed line connected to the fuel oil ring so that fuel oil is passable from the fuel oil ring to the fuel oil feed line, wherein the fuel gas feed line encloses, at least partially, the fuel oil feed line, the fuel gas feed line having an extension between an inlet of the fuel gas feed line and an outlet of the fuel gas feed line, the extension of the fuel gas feed line encircling a portion of the fuel oil feed line, the extension of the fuel gas feed line contributing to avoid thermal expansions and negative vibrational effects.

16. The dual fuel delivery system of claim 15, wherein the fuel oil feed line has an extension connecting the fuel oil feed line to the fuel oil ring, at least a portion of the extension of the fuel oil feed line being encircled by a portion of the extension of the fuel gas feed line.

17. The dual fuel delivery system of claim 16, wherein the extension of the fuel oil feed line comprises at least one metallic hose or at least one hose.

18. The dual fuel delivery system of claim 16, comprising an L-shaped connector connecting the main fuel line to the fuel ring.

19. The dual fuel delivery system of claim 18, comprising a burner positioned to receive fuel oil from the fuel oil feed line and fuel gas from the fuel gas feed line.

20. The dual fuel delivery system of claim 18, comprising a fuel manifold connected to an inlet of the main fuel line to supply fuel oil and fuel gas to the main fuel line; and wherein:
  the extension of the main fuel gas conduit comprises a bellows or a metallic bellows;
  the extension of the fuel gas feed line comprises a bellows or metallic bellows; and
  the extension of the fuel oil feed line comprises at least one metallic hose or at least one hose.

* * * * *